(12) United States Patent
Magyar et al.

(10) Patent No.: US 9,015,312 B2
(45) Date of Patent: Apr. 21, 2015

(54) NETWORK MANAGEMENT SYSTEM AND METHOD FOR IDENTIFYING AND ACCESSING QUALITY OF SERVICE ISSUES WITHIN A COMMUNICATIONS NETWORK

(75) Inventors: Gábor Magyar, Kecskemét (HU); Tamas Borsos, Budapest (HU); László Kovács, Martonvásár (HU); András Veres, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 117 days.

(21) Appl. No.: 13/501,407

(22) PCT Filed: Oct. 11, 2010

(86) PCT No.: PCT/IB2010/054597
§ 371 (c)(1),
(2), (4) Date: Apr. 11, 2012

(87) PCT Pub. No.: WO2011/045736
PCT Pub. Date: Apr. 21, 2011

(65) Prior Publication Data
US 2012/0203788 A1      Aug. 9, 2012

Related U.S. Application Data

(60) Provisional application No. 61/252,255, filed on Oct. 16, 2009.

(51) Int. Cl.
*H04L 12/24* (2006.01)
(52) U.S. Cl.
CPC ......... *H04L 41/5009* (2013.01); *H04L 41/5032* (2013.01); *H04L 41/5035* (2013.01)

(58) Field of Classification Search
CPC ... G06Q 10/00; G06Q 10/20; G06Q 41/5003; G06Q 43/0811; H04L 41/5035; H04L 41/5003; G06F 17/30
USPC .................................. 707/748; 709/223–224
See application file for complete search history.

(56) References Cited

U.S. PATENT DOCUMENTS 6,643,613 B2 * 11/2003 McGee et al. ................ 702/186
7,076,695 B2 *  7/2006 McGee et al. ............... 714/47.2

(Continued)

FOREIGN PATENT DOCUMENTS

| JP | A2000-341204 | 12/2000 |
| JP | 2006/080783 | 3/2006 |
| JP | 2007-006203 | 1/2007 |

OTHER PUBLICATIONS

International Search Report for PCT/IB2010/054597, mailed Jan. 21, 2011.
Written Opinion of the International Searching Authority for PCT/IB2010/054597, mailed Jan. 21, 2011.

(Continued)

*Primary Examiner* — Kevin Bates
*Assistant Examiner* — Chen-Liang Huang
(74) *Attorney, Agent, or Firm* — Baker Botts, LLP (57) ABSTRACT

A network management system (100) and a method are described herein that are capable of identifying and accessing Quality of Service (QoS) issues within a communications network (104, 106). In one application, the network management system (100) includes a service performance unit (108), a service performance database (110), a factor scoring system (112), a factor score database (114) and a factor strength analysis module (116).

19 Claims, 5 Drawing Sheets

(56) References Cited

U.S. PATENT DOCUMENTS

| | | | |
|---|---|---|---|
| 7,389,203 B2* | 6/2008 | Tanaka | 702/185 |
| 8,676,740 B2* | 3/2014 | Ueki | 706/52 |
| 2005/0181835 A1 | 8/2005 | Lau et al. | |
| 2007/0076942 A1* | 4/2007 | Yatsugake et al. | 382/141 |
| 2008/0037443 A1 | 2/2008 | Ansari et al. | |
| 2008/0046266 A1* | 2/2008 | Gudipalley et al. | 705/1 |
| 2008/0080376 A1 | 4/2008 | Adhikari et al. | |
| 2009/0181665 A1 | 7/2009 | Sater et al. | |
| 2010/0162029 A1* | 6/2010 | Powell et al. | 714/2 |

OTHER PUBLICATIONS

International Preliminary Report on Patentability for PCT/IB2010/054597, mailed Feb. 7, 2012.

Mourelatou, K. et al, "An approach to identifying QoS problems", Computer Communications, vol. 17, No. 8, (Aug. 1, 1994), pp. 563-570.

Ip. Com Journal, "Automatic root cause analysis in metrics dependency tree using multiple criteria ranking", (Nov. 18, 2008), 3 pages.

Japanese Office Action for Application No. 2012/533728 (with computer translation) mailing date Jun. 23, 2014.

* cited by examiner

NETWORK MANAGEMENT SYSTEM AND METHOD FOR IDENTIFYING AND ACCESSING QUALITY OF SERVICE ISSUES WITHIN A COMMUNICATIONS NETWORK

This application is the U.S. national phase of International Application No. PCT/IB2010/054597, filed 11 Oct. 2010, which designated the U.S. and claims the benefit of U.S. Provisional No. 61/252,255, filed 16 Oct. 2009, the entire contents of each of which are hereby incorporated by reference.

TECHNICAL FIELD

The present invention relates to a network management system and a method for identifying and accessing Quality of Service (QoS) issues within a communications network.

BACKGROUND

The following abbreviations and notations are herewith defined, at least some of which are referred to within the following description of the prior art and the present invention.
3GPP Third Generation Partnership Project
BSC Base Station Controller
BTS Base Transceiver Station
DCH Dedicated Channel
E-UTRAN Evolved-UMTS Radio Access Network
GERAN GSM EDGE Radio Access Network
GGSN Gateway GPRS Support Node
GPRS General Packet Radio Service
HS High Speed
LTE Long-Term Evolution
MME Mobile Management Entity
MOS Mean Opinion Score
OAM Operation and Maintenance
QoS Quality of Service
RNC Radio Network Controller
RSCP Received Signal Code Power
SGSN Serving GPRS Support Node
S-GW Serving Gateway
SQM Service Quality Metric
UTRAN UMTS Radio Access Network Quality of Service (QoS) has enormous importance in a communication network since a customers' willingness to use the offered services of the communications network drastically decreases whenever the quality of the service is not acceptable. In fact, it is commonly envisaged that in the very near future (even today) the network operators will mainly be differentiated among customers based on the level of QoS they can reliably offer to their customers assuming that the prices of network services converge.

In today's mobile data network, for instance, providing a good QoS is a continuous challenge since the number of services, the number of customers, and thus the number of individual service usage transactions is rapidly increasing while the capacity of the communications network that enables this demand for the services cannot grow forever due to certain physical limitations. This means that there will always be shorter periods, longer periods, or situations when the number of available network resources will be limited when compared to the actual demand set that is to be served simultaneously.

Modern network operators try to continuously monitor the performance of their communications network with respect to the individual services they offer by using service-centric management systems. These service-centric management systems aim to detect changes (drops) in service quality and then the operator tries to find the reason and solution for the QoS degradation to please its customers and to avoid such further drops in service quality.

Today, each service has a QoS measured through specific service quality metrics (SQM). These service quality metrics are typically well-known and widely accepted, and are even standardized. For instance, in the case of a mobile data network with mobile internet for mobile broadband) being the service in question, then the typical SQM to be monitored and maintained on an acceptable level is the end-to-end user throughput. Furthermore, in the case of a video streaming service in the same environment, then the mean opinion score (MOS) of the video is a good SQM and this has even been standardized in 3GPP.

Communication networks are very complex so there are plenty of individual effects that can deteriorate the QoS and thus yield a lower value of the corresponding SQM. These individual and often (partly) independent effects are referred to herein as factors. In a mobile data network, typical factors are for instance the current network load, i.e., the number of parallel active users in the same cell where the service is used, the type of user equipment participating in the service usage transaction, or the current physical radio conditions, which are measured through several factors such as for instance channel quality information, signal strength, and the congestion situation on the transport links. There are also factors and effects which can come from outside of the network operator's domain, but their elect such as a loss on the interne side outside of the operator's core network can be detected as well.

Almost every network operator today has a certain part of its communication system devoted to performance aspects. This typically involves the use of a performance monitoring module that records individual pieces of information related to network performance. Then, another module (or series of modules) is (are) responsible for using the collected information and providing a means to assess, QoS issues in a tailored way (or tailored ways).

The first and probably one of the most important issues for the performance monitoring module is to collect the correct performance data from inside the communication network that can later be used to assess the QoS in a reliable way. This means that the correct granularity, the detail level, all relevant data related to factors that can affect the final QoS should be carefully selected and included in the data collection. In addition, since there are several individual data sources throughout a communications network (many types of nodes exist where the traffic passes through) that provide meaningful information related to service performance, these individual data pieces in a good performance management system should be correlated to each other, in order to put the pieces together to see all the aspects affecting the performance of the communications network. However, this leads to a second issue for the performance management system since putting the pieces together is not trivial and is often not followed this means that the individual data sources are commonly analyzed separately.

The third issue for a good performance monitoring system it that it should in an ideal case work on-line, continuously, and automatically to execute and evaluate the data pieces. However, many performance monitoring systems work periodically on a demand type of execution and evaluation of the data pieces by, for instance, checking the network status weekly or monthly following standardized reporting procedures and then aggregating high level statistical information coming from communication network logging. Hence, it can be seen that there are several issues associated with the current network monitoring and QoS management techniques typically used today by the network operators. These issues and other issues are satisfied by the present invention.

SUMMARY

A network management system, a method, a factor scoring system, a factor strength analysis module, and a service performance unit are described in the independent claims of the present application. Advantageous embodiments of the network management system, the method, the factor scoring system, the factor strength analysis module, and the service performance unit are described in the dependent claims. In one aspect, the present invention provides a network management system for identifying and accessing QoS issues within a communications network. The network management system comprises: (a) a service performance unit that (1) captures traffic and performance related data on interfaces in the communications network and at nodes in the communications network, (2) formats the captured traffic and performance related data into individual service usage transactions each including an identification field and a factor, there the factor describes an aspect of the communications network when the corresponding service usage transaction has taken place, and (3) correlates the individual service usage transactions based on the identification fields to create service performance records each including one of the identification fields, multiple factors, and a service quality metric; (b) a service performance database, coupled to the service performance unit, that stores the service performance records; (c) a factor scoring system, coupled to the service performance database, that computes a score for each factor in each service performance record, where the score indicates an influence the corresponding factor has on the corresponding service quality metric; (d) a factor score database, coupled to the factor scoring system, that stores the computed factor scores for each service performance record together with a reference to the corresponding service performance record; and (e) a factor strength analysis module, coupled to the factor score database and the service performance database, that aggregates at least a subset of the service performance records together with the corresponding factor scores and uses a rule set to analyze the aggregated records to indicate a cause for a specific service quality degradation detected within the communications network. The network management system has an advantage in that it can capture traffic and performance related data and analyze the resulting data to come to reliable knowledge to increase the QoS and improve the network performance.

In yet another aspect, the present invention provides a method for identifying and accessing QoS issues within a communications network. The method comprises the steps of (a) creating service performance records by (1) capturing traffic and performance related data on interfaces in the communications network and at nodes in the communications network, (2) formatting the captured traffic and performance related data into individual service usage transactions each including an identification field and a factor, where the factor describes an aspect of the communications network when the corresponding service usage transaction has taken place, and (3) correlating the individual service usage transactions based on the identification fields to create the service performance records each including one of the identification fields, multiple factors, and a service quality metric; (b) storing the service performance records; (c) computing a score for each factor in each service performance record, where the score indicates an influence the corresponding factor has on the corresponding service quality metric; (d) storing the computed factor scores fir each service performance record together with a reference to the corresponding service performance record; and (e) aggregating at least a subset of the service performance records together with the corresponding factor scores and using a rule set to analyze the aggregated records to indicate a cause for a specific service quality degradation detected within the communications network. The method has an advantage in that it can capture traffic and performance related data and analyze the resulting data to come to reliable knowledge to increase the QoS and improve the network performance.

In still yet another aspect, the present invention provides a factor scoring system for identifying and accessing QoS issues within a communications network. The factor scoring system comprises: (a) a processor; and (b) a non-transitory memory that stores processor-executable instructions wherein the processor interfaces with the non-transitory memory and executes the processor-executable instructions to: (i) retrieve a plurality of service performance records each including an identification field, multiple factors, and a service quality metric; and (ii) compute a score for each factor in each service performance record, where the score indicates an influence the corresponding factor has on the corresponding service quality metric. The factor scoring system has an advantage in that it can analyze captured traffic and performance related data to obtain reliable knowledge that can be used to increase the QoS and improve the network performance.

In yet another aspect, the present invention provides a factor strength analysis module for identifying and accessing QoS issues within a communications network. The factor strength analysis module comprises: (a) a processor; and (b) a non-transitory memory that stores processor-executable instructions wherein the processor interfaces with the non-transitory memory and executes the processor-executable instructions to: (i) retrieve a plurality of service performance records each including an identification field, multiple factors, and a service quality metric; (ii) retrieve computed factor scores for each factor in each of the service performance records; (iii) aggregate the service performance records together with the corresponding factor scores and use a rule set to analyze the aggregated records to indicate a cause for a specific service quality degradation detected within the communications network. The factor strength analysis module has an advantage in that it can analyze service performance records and computed factors to obtain reliable knowledge that can be used to increase the QoS and improve the network performance.

In still yet another aspect, the present invention provides a service performance unit for identifying and accessing QoS issues within a communications network. The service performance unit comprises: (a) a processor; and (b) a non-transitory memory that stores processor-executable instructions wherein the processor interfaces with the non-transitory memory and executes the processor-executable instructions to: (i) capture traffic and performance related data on interfaces in the communications network and at nodes in the communications network; (ii) format the captured traffic and performance related data into individual service usage transactions each including an identification field and a factor, where the factor describes an aspect of the communications network when the corresponding service usage transaction has taken place; and (iii) correlate the individual service usage transactions based on the identification fields to create service performance records each including one of the identification fields, multiple factors, and a service quality metric. The service performance unit has an advantage in that it can capture, format, and correlate traffic and performance related data which can be analyzed to increase the QoS and improve the network performance.

Additional aspects of the invention will be set forth, in part, in the detailed description, figures and any claims which follow, and in part will be derived from the detailed description, or can be learned, by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
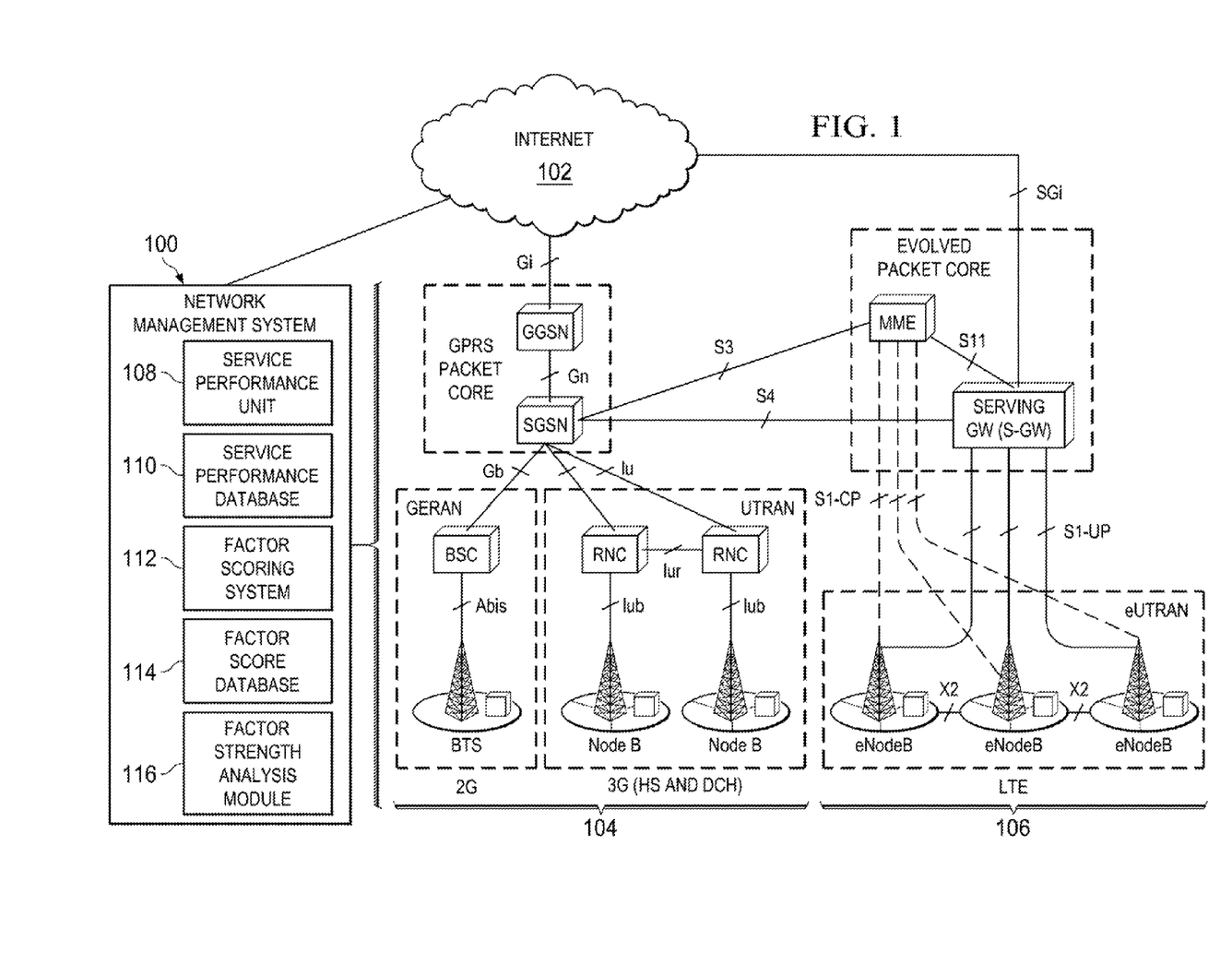
FIG. 1 is a block diagram that illustrates a network management system interfacing with the internet and two exemplary mobile data communications networks in accordance with an embodiment of the present invention.

Referring to FIG. 1, there is a block diagram that illustrates a new network management system 100 interfacing with the internet 102 and two exemplary mobile data communications networks 104 and 106 in accordance with an embodiment of the present invention. The two exemplary mobile data communication networks 104 and 106 are well known to those skilled in the art hence a detailed description is not provided herein about their various structures and individual components. In addition, those skilled in the art will readily appreciate that the network management system 100 of the present invention can interface with any number and an type of communication system. The network management system 100 functions to identify and access QoS issues within one or both of the exemplary mobile data communications networks 104 and 106. As shown, the network management system 100 includes a service performance unit 108, a service performance database 110, a factor scoring system 112, a factor score database 114, and a factor strength analysis module 116. A detailed discussed about the network management system 100 and each of these components 108, 110, 112, 114 and 116 is provided below with respect to FIGS. 2-5. To aid in describing the network management system 100 and each of the components 108, 110, 112, 114 and 116 the following definitions/notations are provided:

Service usage transaction: a logical entity that represents an individual transaction of the user for using a given service of the communications network 104 or 106.

Service quality metric: a real value (denoted by SQM) that represents an objective evaluation of the service quality during a service usage transaction. Example: SQM for mobile broadband session is the throughput value in kbit/s.

Figure 4:
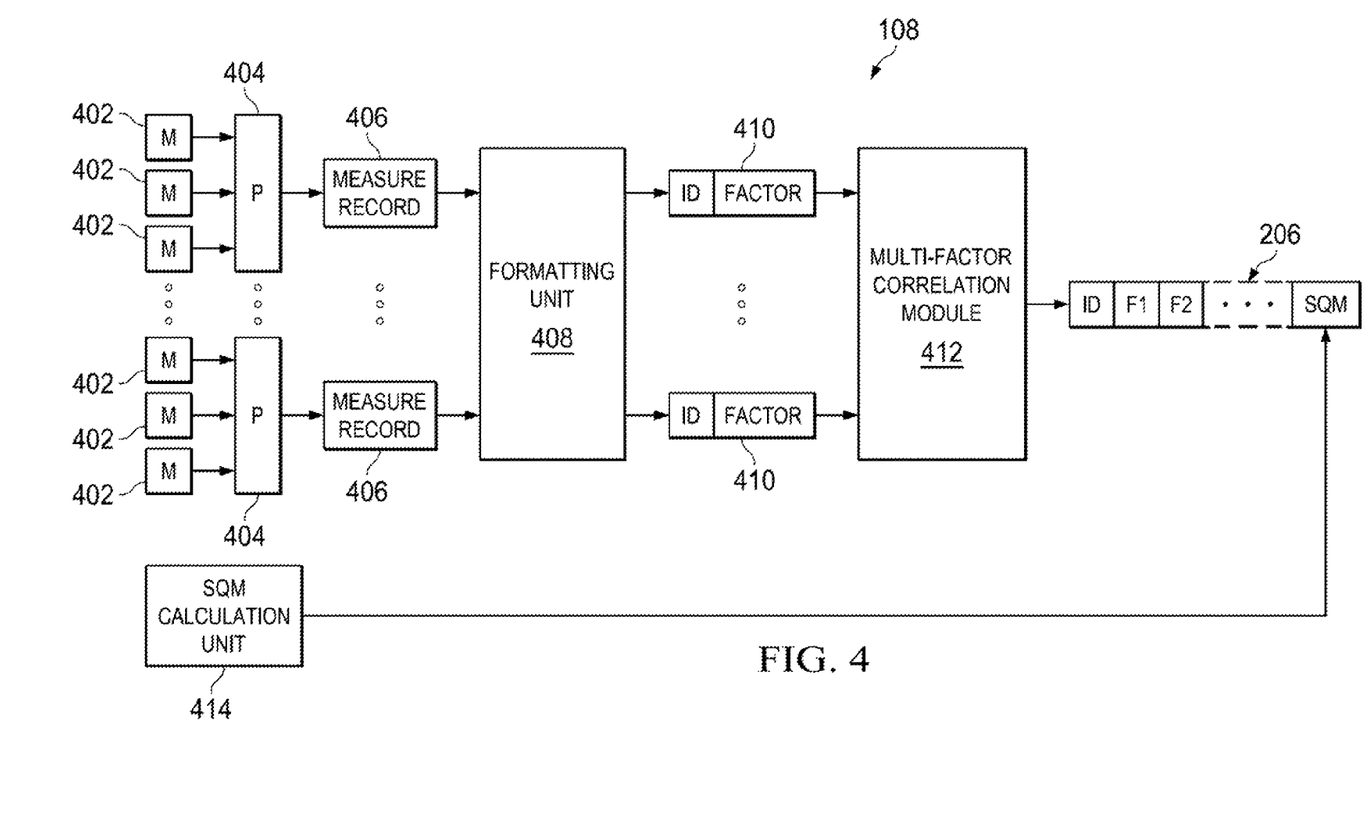
FIG. 4 is a block diagram that illustrates an exemplary function of a service performance unit within the network management system in accordance with an embodiment of the present invention.

Factor: a real or nominal value (denoted by F) which is either a concrete measurement value or it is derived from several individual measurements (see FIG. 4). By its value, a factor describes one particular aspect of the communications network 104 or 106 when the service usage transaction has taken place. Example: in the mobile internet environment, the actual value of the HS-connected users within the same cell where the transaction has taken place is a factor.

Service performance record: a collection of factors with their values and the SQM, for a specific service usage transaction. Denoted by $(F_1, F_2, \ldots F_m, SQM)$, where m is the total number of factor values applied to the network management system 100.

Service Performance database 110: a collection of individual service performance records, with a total of n records, where the i-th record is denoted by: $h_i=(F_{i1}, F_{i2}, \ldots, F_{im}, SQM_i)$.

Empirical probability of SQM: A mapping $p(SQM_i)$: $H \rightarrow R+$ that gives the empirical probability of the occurrence a given SQM value $SQM_i$ among the SQM values belonging to a set of service performance records H.

Similarity function $\delta(F_k)$: A mapping that returns a subset of service performance records $\{R_i\}$ for which the value of k-th factor $F_{ik}$ is close to the value of $F_k$.

Figure 2:
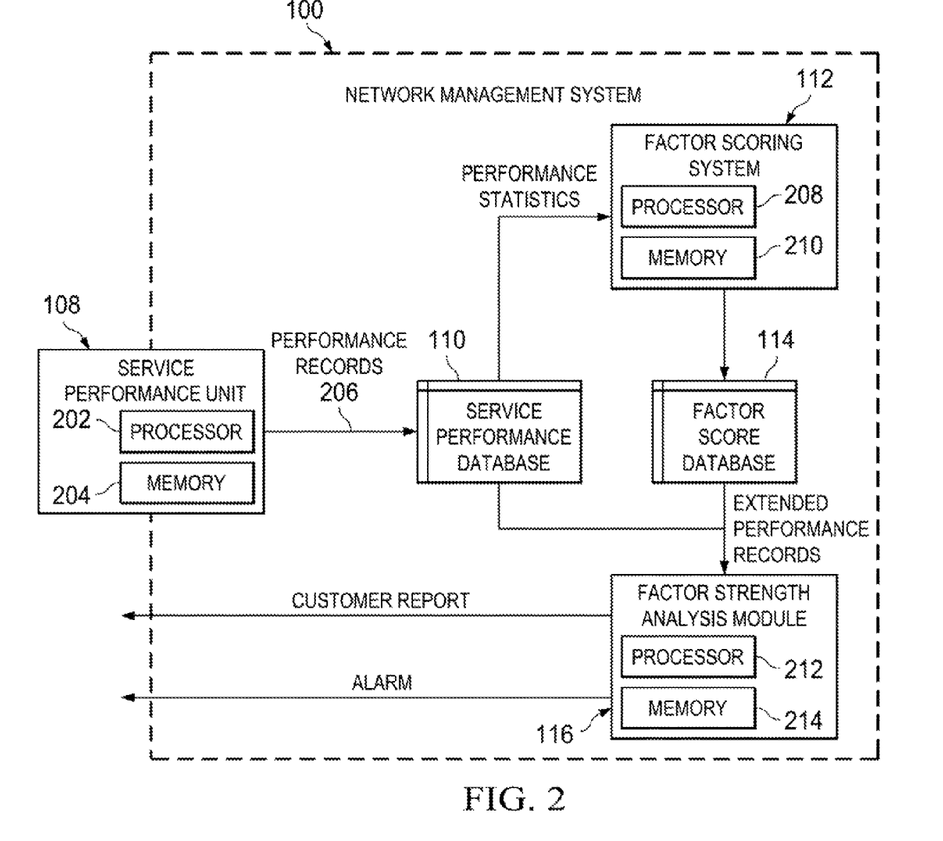
FIG. 2 is a block diagram that illustrates in greater detail the components of the network management system in accordance with an embodiment of the present invention.
Figure 3:
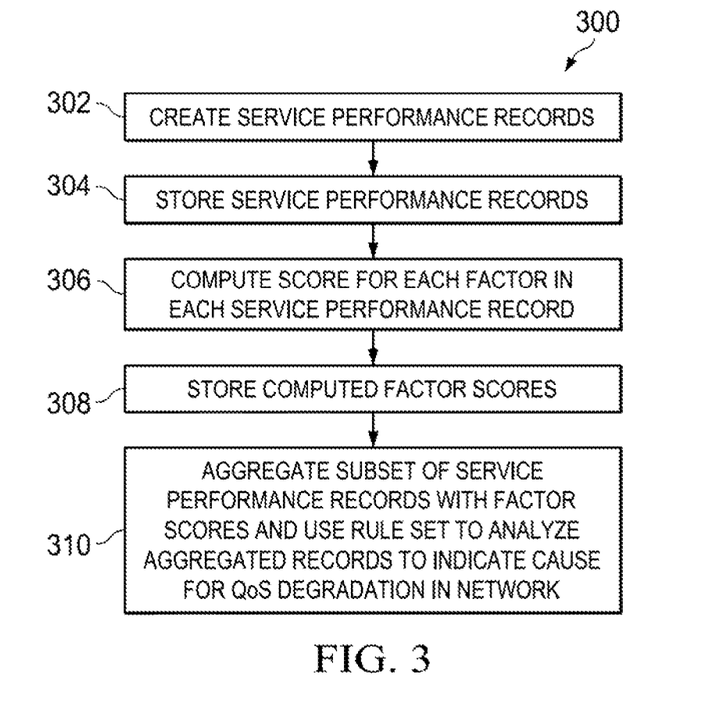
FIG. 3 is a flowchart that illustrates the steps of an exemplar method in accordance with an embodiment of the present invention.

Referring to FIGS. 2 and 3 there are respectively shown a block diagram illustrating the main components of the network management system 100 and a flowchart illustrating the main steps of a method 300 in accordance with an embodiment of the present invention. As shown, the network management system 100 includes the service performance unit 108, the service performance database 110, the factor scoring system 112, the factor score database 114, and the Factor strength analysis module 116. The service performance unit 108 includes a processor 202 and a non-transitory memory 204 that stores processor-executable instructions wherein the processor 202 interfaces with the non-transitory memory 204 and executes the processor-executable instructions to: (1) capture traffic and performance related data on standardized interfaces (e.g., Iu-PS, Gn, Gi in the 3G communications network 104 and/or X2, S1-UP, S1-CP, S11, SGi in the LTE communications network 106) and at certain nodes that provide performance data collection features (e.g., NodeB, RNC, GGSN, SGSN in the 3G communications network 104 and/or eNodeB, MME, S-GW in the LTE communications network 106); (2) format the captured traffic and performance related data into individual service usage transactions each including an identification field and a factor, where the factor describes an aspect of the communications network when the corresponding service usage transaction has taken place, and (3) correlate the individual service usage transactions based on the identification fields to create service performance records 206 each including one of the identification fields, multiple factors, and a service quality metric (see step 302 in FIG. 3). The service performance database 110 is coupled to the service performance unit 108 and functions to store the service performance records 206 (see step 304 in FIG. 3).

The factor scoring system 112 is coupled to the service performance database 108 and includes a processor 208 and a non-transitory memory 210 that stores processor-executable instructions wherein the processor 208 interfaces with the non-transitory memory 210 and executes the processor-executable instructions to compute a score for each possible influencing network factor for each individual service performance record 206 in the service performance database 110. The score indicates the possible influence of the given concrete factor value on the service quality metric of the given service performance record 206 (see step 306 in FIG. 3). The factor score database 114 is coupled to the factor scoring system 112 and functions to store the computed factor scores for each service performance record 206 together with a reference to the corresponding service performance record 206 (see step 308 in FIG. 3).

The factor strength analysis module 116 is coupled to the factor score database 114 and the service performance database 110. In addition, the factor strength analysis module 116 includes a processor 212 and a non-transitory memory 214 that stores processor-executable instructions wherein the processor 212 interfaces with the non-transitory memory 214 and executes the processor-executable instructions to aggregate at least a subset of the service performance records 206 (obtained from the service performance database 110) together with the corresponding factor scores (obtained from the factor score database 114) and uses a rule set to analyze the aggregated records to indicate a cause for a specific service quality degradation detected within the communications network(s) 104 and 106 (see step 310 in FIG. 3). In one application, the factor strength analysis module 116 can aggregate the service performance records 206 and the factor score records on cell basis to identify one or more factors (root cause(s)) which have an impact on cell performance quality of one or more cells in the communications network(s) 104 and 106. Then, the factor strength analysis module 116 can generate alarms for the cell(s) with considerable service quality degradation. In another application, the factor strength analysis module 116 can aggregate the service performance records 206 and the factor score records for each user, taking into account all the different service usage transactions of the same user, and then generate customer reports for a customer care system for users suffering significant service quality degradation. The customer reports can reveal the main reason for the QoS degradation for a given user.

If desired, the network management system 100 may have a single processor and a single non-transitory memory that can be used to implement the various functions of the service performance unit 108, the factor scoring system 112, and the factor strength analysis module 116. In the following discussion, several different embodiments of the individual components 108, 110, 112, 114, and 116 associated with the network management system 100 will be described in detail to help further explain some of the features and advantages of the present invention.

Service Performance Unit 108 and Service Performance Database 110

The service performance unit 108 functions to pre-process the measurements obtained at individual data sources in the communications network(s) 104 and 106 by (i) capturing traffic and performance related data on interfaces in the communications network and at nodes in the communications network; (ii) formatting the captured traffic and performance related data into individual service usage transactions each including an identification field and a factor, where the factor describes an aspect of the communications network when the corresponding service usage transaction has taken place; and (iii) correlating the individual service usage transactions based on the identification fields to create service performance records 206 each including one of the identification fields, multiple factors, and a service quality metric.

Referring to FIG. 4, there is a block diagram that illustrates one exemplary way that the service performance unit 108 can function to pre-process the measurements obtained at individual data sources in the communications network(s) 104 and 106 in accordance with an embodiment of the present invention. In this example, the service performance unit 108 captures measurements 402 from different data sources and parses those measurements 402 using a parsing module 404 to form a measurement record 406. The measurement records 406 (raw measurement data) are formatted by a formatting unit 408 to form extended measurement records 410 which have an identification field (ID) and a factor (F1,F2, . . . ). Then, a multi-factor correlation module 412 correlates the extended measurement records 410 based on their identification fields and a SQM calculation unit 414 computes a SQM for each transaction and this computed SQM is added to the correlated extended measurement records to form service performance records 206. Thus, the main output from the service performance unit 108 is a set of service performance records 206 which are stored in the service performance database 110.

Factor Scoring Module 112 and Factor Score Database 114

The factor scoring system 112 assigns a numeric value for each factor of each service performance record 206 and then stores the factor scores together with a reference to the respective service performance record 206 in the factor score database 114. In particular, given that there is a service performance record 206 for the i-th service usage transaction "$F_{i1}$, $F_{i2}$, . . . $SQM_i$" (having m type of performance affecting factors and the SQM collected for the transaction) stored in the service performance database 110, the factor scoring system 112 computes a record "$S_{i1}, S_{i2}, \ldots, S_{im}$" with a reference to the respective service performance record 206 and stores it within the factor score database 114. For computing the S score values for an individual factor of a given service performance record 206, the factor scoring system 112 uses, statistical information that can be obtained by analyzing the full set of the given factors and SQM values for all of the individual service performance records 206. In this regard, the factor scoring module 112 can implement either a discrete scoring process (rule based scoring process) or a continuous scoring process to assign a numeric value for each factor of each service performance record 206. These two exemplary scoring processes are described in detail next.

Discrete Scoring (Rule Based Scoring)

The discrete scoring process assigns a discrete score value S to a given factor of a service performance record 206 which is either 0 or 1. S=1 means that the actual factor value had influence on the SQM value of the given service usage transaction, while S=0 means that the factor value had no influence on the SQM value of the given service, usage transaction. The score computation can be done as follows: For each factor $F_k$ a threshold $T_k$ is determined and if the factor value is above (or below) the threshold it has a significant influence on the SQM therefore S=1 otherwise S=0. The determination of the thresholds T can be based on the statistical properties of the service performance records 206.

In one example, the thresholds T can be set according to a specified percentage of the factor distribution, e.g. if the factor value falls into the upper or lower 10 percent of the factor value distribution then in this case this factor is considered to be an influencing factor. For instance, Received Signal (lode Power (RSCP) is a factor which is related to radio conditions and typically ranges from −120 (had condition) to −45 (good condition). in the collected service performance records 206, assume the RSCP in the lower 10 percent was below −105. Thus, whenever there is a bad SQM value (e.g. throughput of 450 kbps in 3G network) and the corresponding RSCP value is below −105, then the factor scoring module 112 would mark the RSCP as an influencing factor.

In another example, the thresholds T can be set according to observed SQM values as a function of the given factor where a threshold T is set in a way to ensure that for the "non-influencing" part of the corresponding factor's range that the average value of the SQM is acceptable. For instance, the SQM values can be checked as a function of the RSCP values (see above example) where if the RSCP is observed to be above −80 and the average throughput (the SQM value) is above 1.5 Mbps, which is acceptable for 3G networks. Then, the factor scoring module 112 would set the threshold for RSCP to −80.

An advantage of the discrete scoring approach is its simplicity, easy implementation, and the possibility to incorporate expert knowledge into the factor scoring module 112 when defining or computing the thresholds T for each factor. However, a drawback of the discrete scoring approach lies in the discrete marking where a factor can get only 0 or 1 as a score, and often in the "real world" the transition from good to bad with respect to the factor value is not that discrete even though in many cases the discrete score is applicable.

Continuous Scoring

The continuous scoring process assigns a continuous score value (S>0) to a given factor of a service performance record 206. If S>=1, then there is no influence detected on the SQM value by the given factor value, while if S>1 then there is significant influence of the factor value on the SQM value of the given service usage transaction. The larger score value S indicates the given factor has a greater influence on the SQM value of the given service usage transaction.

Figure 5:
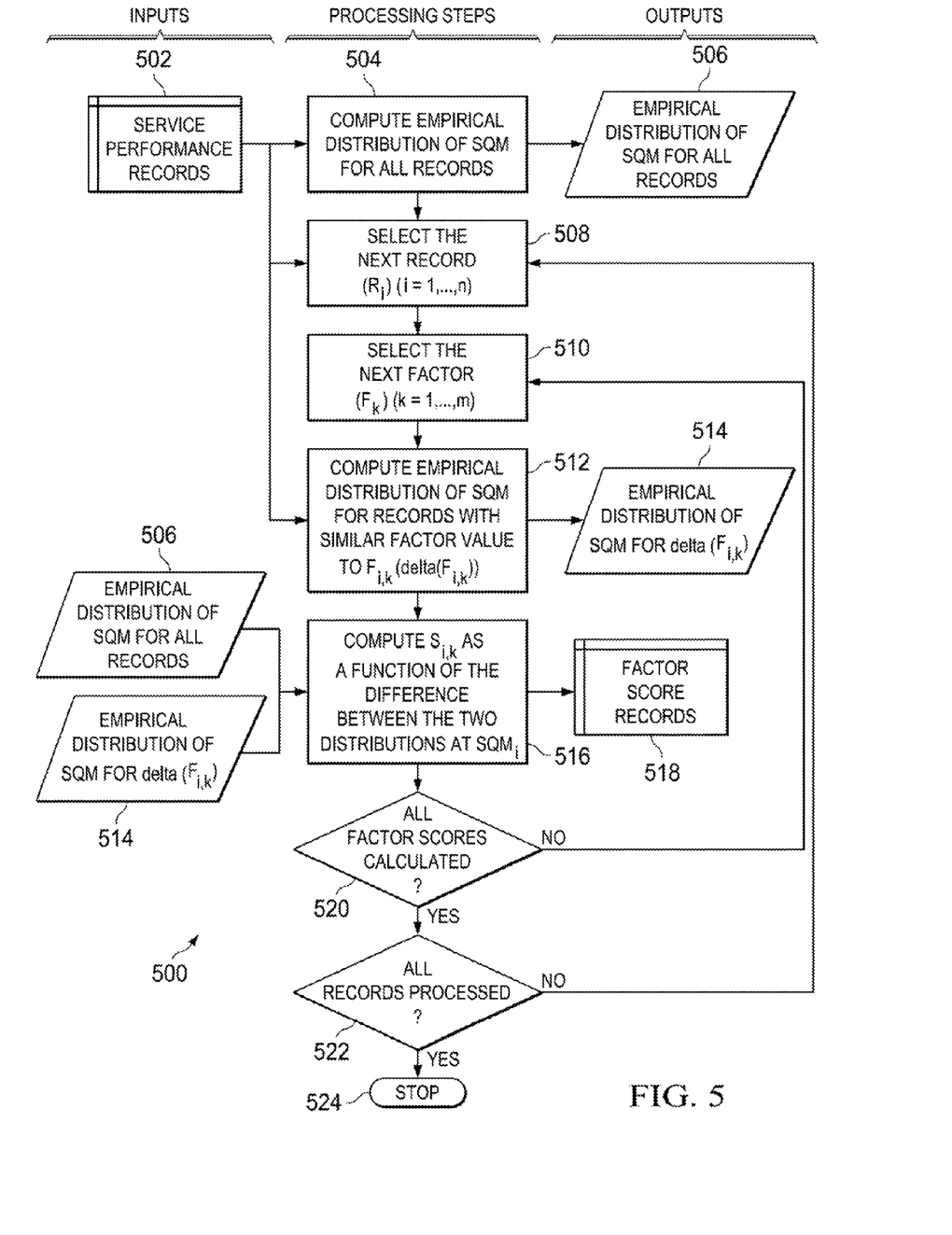
FIG. 5 is a flowchart that depicts an exemplary continuous scoring function of a factor scoring module within the network management system in accordance with an embodiment of the present invention.

Referring to FIG. 5, there is a flowchart that depicts an exemplary continuous scoring process 500 that can be implemented by the factor scoring module 112 in accordance with an embodiment of the present invention. In this flowchart, the boxes on the left side are "inputs", the boxes in the middle are "processing steps", and the boxes on the right side are "outputs". At step 502, the factor scoring module 112 obtains the service performance records 206. At step 504, the factor scoring module 112 computes an empirical distribution 506 of one of the SQMs for all of the service performance records 206. At step 508, the factor scoring module 112 selects one of the service performance records 206 ($R_i$, i=1, . . . , n). At step 510, the factor scoring module 112 selects one of the factors ($F_k$, k−1, . . . , m) in the selected service performance record 206. At step 512, the factor scoring module 112 computes an empirical distribution 414 of the one SQM for a subset of the service performance records 206 with a similar factor score value for the selected one factor ($F_{i,k}$(delta($F_{i,k}$))). At step 516, the factor scoring module 112 computes the factor score 518 ($S_{i,k}$) of the selected service performance record 206 by comparing the computed empirical distribution 506 of one of the SQMs ($SQM_i$) for all of the service performance records 206 and the computed empirical distribution 514 of the one SQM ($SQM_i$) for the subset of the service performance records 206 with a similar factor score value for the selected one factor. At step 520, the factor scoring module 112 determines if all factor scores have been calculated for the selected service performance record 206. If the result of step 520 is no, then the factor scoring module 112 returns to the second selecting step 510 to select the next factor in the selected service performance record 206. If the result of step 520 is yes, then the factor scoring module 112 at step 522 determines if all the service performance records 206 have been processed. If the result of step 522 is no, then the factor scoring module 112 returns to the first selecting step 508 to select the next service performance record 206. If the result of step 522 is yes, then the factor scoring module 112 at step 524 stops since the continuous score value has been assigned to each factor of each service performance record 206.

In this exemplary continuous scoring process 500 one of the main principles is that the factor score $S_{ik}$ of a given performance record $R_i$ is computed by comparing the empirical distribution of the SQM values among a subset of performance records $\delta(F_{ik})$,—i.e., where the factor value is the same or close to $F_{ik}$—with the empirical distribution of SQM among all performance records (see step 516). This means that $S_{ik}$ will be the function of the two $p(SQM_i)$ values $p_\delta$ and $p_{all}$ computed for the two sets of performance records mentioned above. In practice $S_{ik}=p_\delta/p_{all}$ is a suitable function for meaningful score computation. In one example, assume there is a performance record with a RSCP factor value of −100 and a SQM value (throughput) of 400 kbps. The factor scoring module 112 would collect the subset of service performance records 206 with a RSCP factor value around −100 and then calculate the probability $p_\delta$ of SQM~400 kbps from the empirical distribution of SQM values in this subset, say $p_\delta$=0.4. This means that the service performance records 206 with RSCP~−100 will have SQM~400 kbps with 40% probability. Then, the factor scoring module 112 would calculate the probability $p_{all}$ of SQM~400 kbps among all the service performance records 206 (disregarding the RSCP factor value), say $p_{all}$=0.05, meaning that an obtained SQM~400 kbps is 5% among all observations. In this example, the factor score for this RSCP value will be 0.4/0.05=8, indicating a pretty high influencing factor of the RSCP. Hence, a main idea behind the continuous score computation described above is that those factors will get high scores where one can observe a significant difference between the SQM values of service performance records 206 which has the same or similar concrete factor value when compared to the SQM values of the service performance records 206 in the whole dataset.

Factor Strength Analysis Module 116

Once the scores are computed for each service performance record 206, the factor strength analysis module 116 is responsible for providing reliable information for determining the reasons for specific QoS degradations detected in the communications network(s) 104 and 106. The factor strength analysis module 116 performs this analysis based on the aggregation of the factor scores for a specified subset of the service performance records 206 and a rule set to determine the most influencing factors on the QoS. The aggregation function can be e.g. the arithmetic or harmonic mean of the factor scores, and can be performed for each user or for a particular cell or for a given time period (e.g. busy hour). After the aggregation, the factor strength analysis module 116 applies the rule set to pinpoint the important factors. For instance, a rule can be e.g. that if the aggregated factor score is greater than a predefined value, then the factor is marked as an influencing factor. In one application, the factor strength analysis module 116 uses per-user aggregated records to generate customer reports for a customer care system identifying users suffering significant service quality degradation. The generated reports would identify the main factors having an significant effect on the user perceived service quality. In another application, the factor strength analysis module 116 uses cell based aggregated records to generate cell based aggregation alarms for cells with considerable service quality degradation which are forwarded to the necessary network management systems. The generated cell based alarms can pinpoint the root cause(s) of the service quality degradation for the particular cell.

From the foregoing, one skilled in the art will appreciate that the network management system 100 of the present invention enables automatic selection of performance impacting factors related to performance degradation by utilizing a multifactor analysis and scoring process. The measurement preprocessing function brings different forms of performance data into a common format in a way that enables the comparison of factors belonging to one specific service or application enabling unified handling of performance data as one factor vector. The factor scoring function analyses the statistical properties of QoS values in relation to the variability found in different factors. The factor scoring function enables the weighing of a multitude of performance impacting factors against each other thus providing valuable input to root-cause analysis functions. The factor strength analysis function selects and aggregates as large number of weighed and scored factor records and can embody as multitude of performance management and customer care algorithms. As a result, OAM personnel can be provided simple, easy-to-understand reports that focus the attention to those customers, cells and performance degrading factors that have the most impact on the quality of the communication services.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A network management system for identifying and accessing Quality of Service, QoS, issues within a communications network, the network management system comprising:
   a service performance database that stores a plurality of service performance records;
   a factor score database that stores a plurality of computed factor scores for each service performance record together with a reference to the corresponding service performance record; and
   at least one processor comprising:
      a service performance unit, coupled to the service performance database, that (1) captures traffic, and performance related data on interfaces in the communications network and at nodes in the communications network, (2) format the captured traffic and performance related data into service usage transactions each including an identification field and a factor, where the factor describes an aspect of the communications network when the corresponding service usage transaction has taken place, and (3) correlate the individual service usage transactions based on the identification fields to create the plurality of service performance records each including one of the identification fields, multiple factors, and a service quality metric;
      a factor scoring system, coupled to the service performance database, that computes a factor score for each factor in each service performance record, where the factor score indicates an influence the corresponding factor has on the corresponding service quality metric, wherein the factor scoring system is adapted to compute the factor score for each factor by:
         computing an empirical distribution of a selected one of the service quality metrics for all of the service performance records;
         computing an empirical distribution of the one service quality metric for the subset of the service performance records having a similar factor value for a selected one factor; and
         computing the factor score as a function of the computed empirical distribution of the selected one of the service quality metrics for all of the service performance records and the computed empirical distribution of the one service quality metric for the subset of the service performance records having the similar factor value for the selected one factor; and
      a factor strength analysis module, coupled to the factor score database and the service performance database, that aggregates at least a subset of the service performance records together with the corresponding factor scores and uses a rule set to analyze the aggregated records to indicate a cause for a specific service quality degradation detected within the communications network.

2. The network management system of claim 1, wherein the factor scoring system is adapted to assign a discrete score value to each factor of each service performance record based on a predetermined threshold value, wherein one discrete score value indicates that the corresponding factor has an influence on the service quality metric in the corresponding service performance record, and another discrete score value indicates that the corresponding factor has no influence on the service quality metric in the corresponding service performance record.

3. The network management system of claim 1, wherein the factor scoring system is adapted to assign a continuous score value to each factor of each service performance record, wherein one range of continuous score values indicates how much influence the corresponding factor has on the service quality metric in the corresponding service performance record, and another range of continuous score values indicates that the corresponding factor has no influence on the service quality metric in the corresponding service performance record.

4. The network management system of claim 3, wherein the factor scoring system is adapted to assign the continuous score value to each factor of each service performance record by:
   determining if all factor scores have been calculated for the selected service performance record;
      if no, then selecting a next factor in the selected service performance record;
      if yes, then determining if all service performance records have been processed;
         if no, then selecting a next service performance record;
         if yes, then stopping since the continuous score value has been assigned to each factor of each service performance record.

5. The network management system of claim 1, wherein the factor strength analysis module is adapted to use the rule set to analyze per-user aggregated records to generate a customer report identifying one or more factors which have an impact on user perceived service quality for a user experiencing the specific service quality degradation detected within the communications network.

6. The network management system of claim 1, wherein the factor strength analysis module is adapted to use the rule set to analyze cell-based aggregated records to identify one or more factors which have an impact on cell performance quality of one or more cells in the communications network and to generate an alarm for the one or more cells which are experiencing the specific service quality degradation detected within the communications network.

7. A method for identifying and accessing Quality of Service, QoS, issues within a communications network, the method comprising the steps of:
creating service performance records by (1) capturing traffic and performance related data on interfaces in the communications network and at nodes in the communications network, (2) formatting the captured traffic and performance related data into individual service usage transactions each including an identification field and a factor, where the factor describes an aspect of the communications network when the corresponding service usage transaction has taken place, and (3) correlating the individual service usage transactions based on the identification fields to create the service performance records each including one of the identification fields, multiple factors, and a service quality metric;
storing the service performance records;
computing a factor score for each factor in each service performance record, where the factor score indicates an influence the corresponding factor has on the corresponding service quality metric, wherein computing the factor score for each factor comprises:
computing an empirical distribution of a selected one of the service quality metrics for all of the service performance records;
computing an empirical distribution of the one service quality metric for the subset of the service performance records having a similar factor value for a selected one factor; and
computing the factor score as a function of the computed empirical distribution of the selected one of the service quality metrics for all of the service performance records and the computed empirical distribution of the one service quality metric for the subset of the service performance records having the similar factor value for the selected one factor;
storing the computed factor scores for each service performance record together with a reference to the corresponding service performance record; and
aggregating at least a subset of the service performance records together with the corresponding factor scores and using a rule set to analyze the aggregated records to indicate a cause for a specific service quality degradation detected within the communications network.

8. The method of claim 7, wherein the computing step further comprises a step of assigning a discrete score value to each factor of each service performance record based on a predetermined threshold value, wherein one discrete score value indicates that the corresponding factor has an influence on the service quality metric in the corresponding service performance record, and another discrete score value indicates that the corresponding factor has no influence on the service quality metric in the corresponding service performance record.

9. The method of claim 7, wherein the computing step further comprises a step of assigning a continuous score value to each factor of each service performance record, wherein one range of continuous score values indicates how much influence the corresponding factor has on the service quality metric in the corresponding service performance record, and another range of continuous score values indicates that the corresponding factor has no influence on the service quality metric in the corresponding service performance record.

10. The method of claim 9, wherein the step of assigning the continuous score value to each factor of each service performance record further comprises the steps of:
determining if all factor scores have been calculated for the selected service performance record;
if no, then selecting a next factor in the selected service performance record;
if yes, then determining if all service performance records have been processed;
if no, then selecting a next service performance record;
if yes, then stopping since the continuous score value has been assigned to each factor of each service performance record.

11. The method of claim 7, wherein the aggregating and using steps further comprise using the rule set to analyze per-user aggregated records to generate a customer report identifying one or more factors which have an impact on user perceived service quality for a user experiencing the specific service quality degradation detected within the communications network.

12. The method of claim 7, wherein the aggregating and using steps further comprise using the rule set to analyze cell-based aggregated records to identify one or more factors which have an impact on cell performance quality of one or more cells in the communications network and to generate an alarm for the one or more cells which are experiencing the specific service quality degradation detected within the communications network.

13. A factor scoring system for identifying and accessing Quality of Service, QoS, issues within a communications network, the factor scoring system comprising:
a processor; and
a non-transitory memory that stores processor-executable instructions wherein the processor interfaces with the non-transitory memory and executes the processor-executable instructions to:
retrieve a plurality of service performance records each including an identification field, multiple factors, and a service quality metric; and
compute a factor score for each factor in each service performance record, where the factor score indicates an influence the corresponding factor has on the corresponding service quality metric, wherein computing the factor score for each factor comprises:
computing an empirical distribution of a selected one of the service quality metrics for all of the service performance records;
computing an empirical distribution of the one service quality metric for the subset of the service performance records having a similar factor value for a selected one factor; and
computing the factor score as a function of the computed empirical distribution of the selected one of the service quality metrics for all of the service performance records and the computed empirical distribution of the one service quality metric for the subset of the service performance records having the similar factor value for the selected one factor.

14. The factor scoring system of claim 13, wherein the processor executes the processor-executable instructions to assign a discrete score value to each factor of each service performance record based on a predetermined threshold value, wherein one discrete score value indicates that the corresponding factor has an influence on the service quality metric in the corresponding service performance record, and another discrete score value indicates that the corresponding factor has no influence on the service quality metric in the corresponding service performance record.

15. The factor scoring system of claim 13, wherein the processor executes the processor-executable instructions to assign a continuous score value to each factor of each service performance record, wherein one range of continuous score values indicates how much influence the corresponding factor has on the service quality metric in the corresponding service performance record, and another range of continuous score values indicates that the corresponding factor has no influence on the service quality metric in the corresponding service performance record.

16. The factor scoring system of claim 15, wherein the processor executes the processor-executable instructions to assign the continuous score value to each factor of each service performance record by:
    determine if all factor scores have been calculated for the selected service performance record;
        if no, then selecting a next factor in the selected service performance record;
        if yes, then determine if all service performance records have been processed;
            if no, then select a next service performance record;
            if yes, then stop since the continuous score value has been assigned to each factor of each service performance record.

17. A factor strength analysis module for identifying and accessing Quality of Service, QoS, issues within a communications network, the factor strength analysis module comprising:
    a processor; and
    a non-transitory memory that stores processor-executable instructions wherein the processor interfaces with the non-transitory memory and executes the processor-executable instructions to:
        retrieve a plurality of service performance records each including an identification field, multiple factors, and a service quality metric;
        retrieve computed factor scores for each factor in each of the service performance records, where each computed factor score indicates an influence a corresponding factor has on a corresponding service quality metric;
        aggregate the service performance records together with the corresponding factor scores and use a rule set to analyze the aggregated records to indicate a cause for a specific service quality degradation detected within the communications network, and
    wherein each computed factor score is computed as a function of a computed empirical distribution of a selected one of the service quality metrics for all of the service performance records and a computed empirical distribution of a one service quality metric for a subset of the service performance records having a similar factor score value for the selected one factor.

18. The factor strength analysis module of claim 17, wherein the processor executes the processor-executable instructions to use the rule set to analyze per-user aggregated records to generate a customer report identifying one or more factors which have an impact on user perceived service quality for a user experiencing the specific service quality degradation detected within the communications network.

19. The factor strength analysis module of claim 17, wherein the processor executes the processor-executable instructions to use the rule set to analyze cell-based aggregated records to identify one or more factors which have an impact on cell performance quality of one or more cells in the communications network and to generate an alarm for the one or more cells which are experiencing the specific service quality degradation detected within the communications network.

* * * * *